United States Patent
Himmelmann

(10) Patent No.: US 10,063,116 B2
(45) Date of Patent: Aug. 28, 2018

(54) LAMINATION CLAMPING STRUCTURE

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 470 days.

(21) Appl. No.: 14/508,843

(22) Filed: Oct. 7, 2014

(65) Prior Publication Data

US 2016/0099621 A1    Apr. 7, 2016

(51) Int. Cl.
| | |
|---|---|
| H02K 1/24 | (2006.01) |
| H02K 3/52 | (2006.01) |
| H02K 19/38 | (2006.01) |
| H02K 16/00 | (2006.01) |
| H02K 1/28 | (2006.01) |
| H02K 16/02 | (2006.01) |

(52) U.S. Cl.
CPC .............. *H02K 1/28* (2013.01); *H02K 1/24* (2013.01); *H02K 3/527* (2013.01); *H02K 16/00* (2013.01); *H02K 16/02* (2013.01); *H02K 19/38* (2013.01)

(58) Field of Classification Search
CPC ........ H02K 3/487; H02K 3/493; H02K 19/38; H02K 1/24; H02K 3/527; H02K 1/28; H02K 16/00; H02K 16/02
USPC .................... 310/216.129–216.134, 214–215
See application file for complete search history.

(56) References Cited

U.S. PATENT DOCUMENTS

| | | |
|---|---|---|
| D859,361 | 7/1907 | Behrend |
| 3,500,093 A | 3/1970 | Wharton |
| 4,937,486 A * | 6/1990 | Schwanda ............. H02K 3/527 |
| | | 310/197 |
| 5,003,207 A | 3/1991 | Krinickas |
| 5,666,016 A | 9/1997 | Cooper |
| 6,225,723 B1 * | 5/2001 | Cooper .................... H02K 1/24 |
| | | 310/214 |
| 6,465,928 B1 | 10/2002 | Shervington |
| 6,707,205 B2 * | 3/2004 | Johnsen ................ H02K 19/38 |
| | | 310/112 |
| 6,734,585 B2 | 5/2004 | Tornquist |
| 6,885,120 B2 | 4/2005 | Kaminski et al. |

(Continued)

FOREIGN PATENT DOCUMENTS

| | | |
|---|---|---|
| FR | 2897895 | 8/2007 |
| GB | 696760 | 9/1953 |
| JP | 2009273266 A | * 11/2009 |

OTHER PUBLICATIONS

Extended European Search Report dated May 2, 2016 in European Application No. 15188318.8.

(Continued)

*Primary Examiner* — Quyen Leung
*Assistant Examiner* — Eric Johnson
(74) *Attorney, Agent, or Firm* — Snell & Wilmer L.L.P.

(57) ABSTRACT

A generator rotor system having various features is disclosed. The generator rotor system has at least one main generator rotor with winding-pole sets spaced annularly about the rotor. The tendency of the rotor laminations of the poles to distort and or displace under the centrifugal force of the spinning rotor is ameliorated by a lamination clamping structure disposed axially outboard of the winding-pole sets.

12 Claims, 5 Drawing Sheets

(56) References Cited

U.S. PATENT DOCUMENTS

| | | | |
|---|---|---|---|
| 6,933,648 B2* | 8/2005 | Buchan | H02K 3/527 |
| | | | 242/433 |
| 8,120,227 B2* | 2/2012 | Leroy | H02K 9/06 |
| | | | 310/214 |
| 2003/0094872 A1 | 5/2003 | Tornquist et al. | |
| 2004/0051405 A1 | 3/2004 | Doherty et al. | |
| 2004/0263019 A1* | 12/2004 | Buchan | H02K 3/527 |
| | | | 310/214 |
| 2007/0222333 A1 | 9/2007 | Hattori | |
| 2008/0122311 A1* | 5/2008 | Werst | H02K 1/30 |
| | | | 310/216.004 |
| 2009/0083966 A1 | 4/2009 | McCabe et al. | |
| 2010/0283352 A1 | 11/2010 | Lemmers, Jr. et al. | |
| 2010/0320850 A1 | 12/2010 | Lemmers, Jr. et al. | |
| 2010/0320860 A1 | 12/2010 | Patel | |
| 2011/0291518 A1* | 12/2011 | McCabe | H02K 3/527 |
| | | | 310/214 |
| 2012/0025639 A1* | 2/2012 | Zywot | H02K 3/527 |
| | | | 310/54 |
| 2012/0126643 A1 | 5/2012 | Zhong | |
| 2013/0106211 A1* | 5/2013 | Holzner | H02K 3/38 |
| | | | 310/62 |
| 2014/0354091 A1 | 12/2014 | Yamada | |
| 2016/0099624 A1 | 4/2016 | Himmelmann | |

OTHER PUBLICATIONS

First Action Interview Pre-Interview Communication dated Oct. 7, 2016 in U.S. Appl. No. 14/508,762.
Extended European Search Report dated Feb. 24, 2016 in European Application No. 15188115.8.
Preinterview First Office Action dated Feb. 10, 2017 in U.S. Appl. No. 14/508,762.
Final Office Action dated Jul. 12, 2017 in U.S. Appl. No. 14/508,762.
Notice of Allowance dated Sep. 20, 2017 in U.S. Appl. No. 14/508,762.
Communication pursuant to Article 94(3) EPC dated in EP Application No. 15188318.8.
Communication under Rule 71(3) EPC dated May 30, 2017 in EP Application No. 15188115.8.

* cited by examiner

LAMINATION CLAMPING STRUCTURE

FIELD

The present invention relates to the field of high-speed electrical machines, and more specifically, high-speed electrical machines having lamination clamping structures.

BACKGROUND

Many electrical machines operate at high speeds, so that significant centrifugal force is exerted on components of the electrical machine, such as rotor laminations. As a result, rotor laminations may crack or may be distorted or displaced, causing wear and premature failure.

SUMMARY OF THE INVENTION

In accordance with various aspects of the present invention, a main stage generator rotor is disclosed. The main stage generator rotor includes a first winding-pole set including a winding and a pole including rotor laminations. The main stage generator rotor further includes a lamination clamping structure and has an axis of rotation. The lamination clamping structure may be disposed proximate to the pole of the first winding-pole set and may exert a compressive force on the rotor laminations along the axis of rotation.

The lamination clamping structure may include a lamination clamp including a flange extending axially inward from a first annular containment member and axially inward from a second annular containment member. The first annular containment member and the second annular containment member may be disposed axially outboard of the first winding-pole set. The lamination clamp may be held in mechanical communication with the rotor laminations of the pole of the first winding-pole set by the first annular containment member and/or the second annular containment member.

The lamination clamping structure may further have a first axial containment plate having an annular plate axially outboard the first annular containment member, relative to the winding-pole set, and supporting the first annular containment member, and a second axial containment plate supporting the second annular containment member and having an annular plate axially outboard the second axial containment plate, relative to the first winding-pole set, and disposed at the axially opposing side of the first winding-pole set relative to the first axial containment plate, and supporting the second annular containment member. Moreover, the lamination clamping structure may include a tensioning apparatus having a shaft extending through an aperture disposed in the first axial containment plate and terminating in the second axial containment plate whereby the axially compressive force is exerted on the first axial containment plate and the second axial containment plate.

A generator rotor system is also disclosed. The generator rotor system may include a first exciter rotor, a second exciter rotor, a permanent magnet rotor, a first main stage generator rotor, and a second main stage generator rotor. Each of the first main stage generator rotor and the second main stage generator rotor may share an axis of rotation. The first exciter rotor may be disposed at an axial outboard end of the generator rotor system. The permanent magnet rotor may be disposed at a second axial outboard end of the generator rotor system. The second exciter rotor may be disposed adjacent to and axially inboard of the permanent magnet rotor. The first main stage generator rotor and the second main stage generator rotor both may be disposed axially inboard of the first exciter rotor and the second exciter rotor. Each of the first main stage generator rotor and the second main stage generator rotor may include a first winding-pole set having a winding and a pole including rotor laminations. Each may also include a lamination clamping structure. The lamination clamping structure may be disposed proximate to the pole of the first winding-pole set and may exert a compressive force on the rotor laminations along the axis of rotation.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Aircraft often have the need to produce electrical power. To produce this electrical power while limiting weight, the rotor of aircraft generators often spin at very high rotational speeds. These factors result in large centrifugal forces on components of the generator, such as rotor laminations, which leads to component degradation and wear.

In various aircraft generators, the rotor laminations may comprise a stack of separate planar members held together by a binder, such as an epoxy. Because certain rotor laminations are taller (e.g., extend further radially outward and/or inward from the rotor), or because certain rotor laminations are slightly and/or significantly different in shape or thickness (e.g., as measured axially), different rotor laminations experience different load conditions. Because the rotor laminations comprise a stack of separate planar members, often joined by a binder, such as an epoxy, this load is not evenly shared among the other rotor laminations. Thus, one or more rotor laminations may fracture and/or crack under centrifugal force. To address this failure mode, a lamination clamping structure is disclosed.

Figure 1:
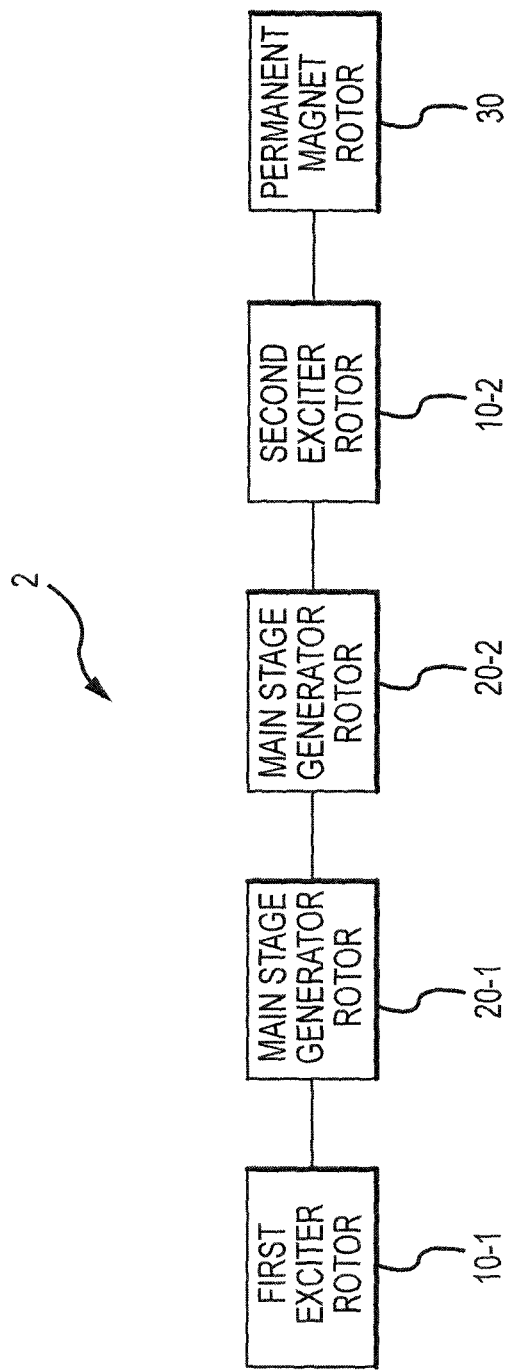
FIG. 1 illustrates a block diagram of an example rotor system of a high speed electrical machine, in accordance with various embodiments.
Figure 2:
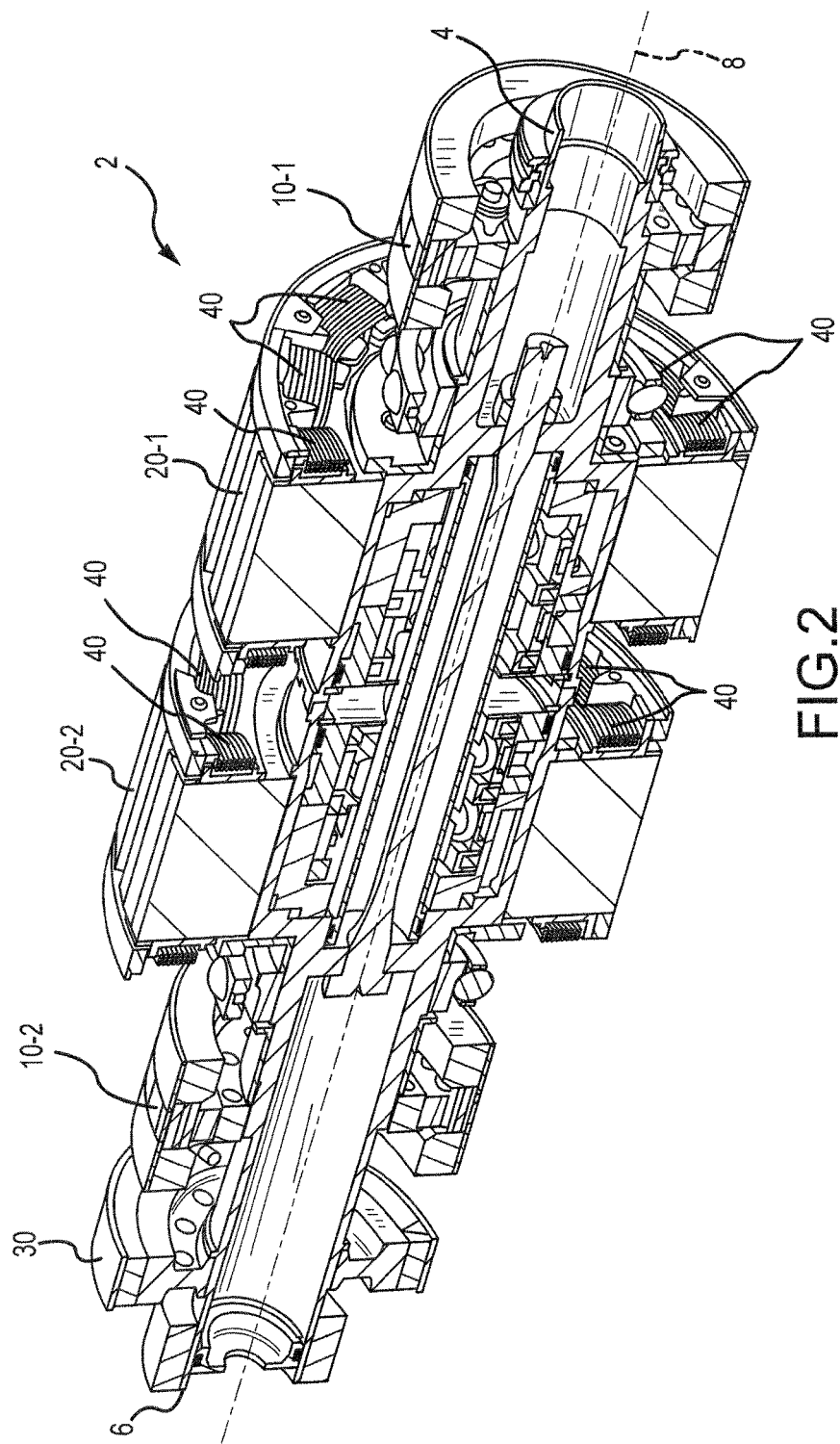
FIG. 2 illustrates an example rotor system of a high speed electrical machine, in accordance with various embodiments.

With reference to FIGS. 1 and 2, a high-speed electrical machine may comprise a wound field synchronous generator. As such, the high speed electrical machine may comprise a generator rotor system 2 comprising one or more exciter rotor, for example, a first exciter rotor 10-1 and a second exciter rotor 10-2, one or more main stage generator rotor 20, for example a first main stage generator rotor 20-1 and a second main stage generator rotor 20-2, and a permanent magnet rotor 30.

The various rotors may be arranged as illustrated in FIG. 2. Specifically, the first exciter rotor 10-1 may be adjacent to a first main stage generator rotor 20-1 and the second exciter rotor 10-2 may be adjacent to a second main stage generator rotor 20-2. The first exciter rotor 10-1 may be disposed at a first axially outboard end 4 of the generator rotor system 2 The first main stage generator rotor 20-1 may be axially inboard of the first exciter rotor 10-1. A permanent magnet rotor 30 may be disposed at a second axially outboard end 6 of the generator rotor system 2. A second exciter rotor 10-2 may be axially inboard of the permanent magnet rotor 30, and a second main stage generator rotor 20-2 may be axially inboard of the second exciter rotor 10-2. In this manner, an exciter rotor may be paired with a corresponding main stage generator rotor, and the pairs may be positioned axially along the length of the generator rotor system 2. At one end, for instance a second axially outboard end 6 of the generator rotor system 2, a permanent magnet rotor 30 may be positioned. However, one may appreciate that any sequence or arrangement of rotors may be implemented. For example, a first main stage generator rotor 20-1 and second main stage generator rotor 20-2 may be disposed between a first exciter rotor 10-1 and a second exciter rotor 10-2, or any other desired arrangement may be chosen.

The generator may operate in various ways. For example, with reference to FIGS. 1-4, an AC current may be generated by an excitation stage (e.g., an exciter rotor 10) which is then rectified, creating a DC current. The DC current is conducted through the windings 58 of a plurality of winding-pole sets 40 arranged annularly around the axis of rotation 8 of each main stage generator rotor 20. Each winding 58 wraps around a pole 57, thus forming a winding-pole set 40. As the current flows through the each winding 58, a magnetic field is created on each pole 57. The main stage generator rotor 20 is mechanically rotated about an axis of rotation 8, thus rotating the plurality of winding-pole sets 40 arranged annularly around the axis of rotation 8 of the main stage generator rotor 20. In response to this rotation, an alternating current is generated in a main stage generator stator (not shown) located radially outward of each main stage generator rotor 20. This alternating current is harvested, and optionally rectified or otherwise processed, and distributed across the aircraft.

Figure 4:
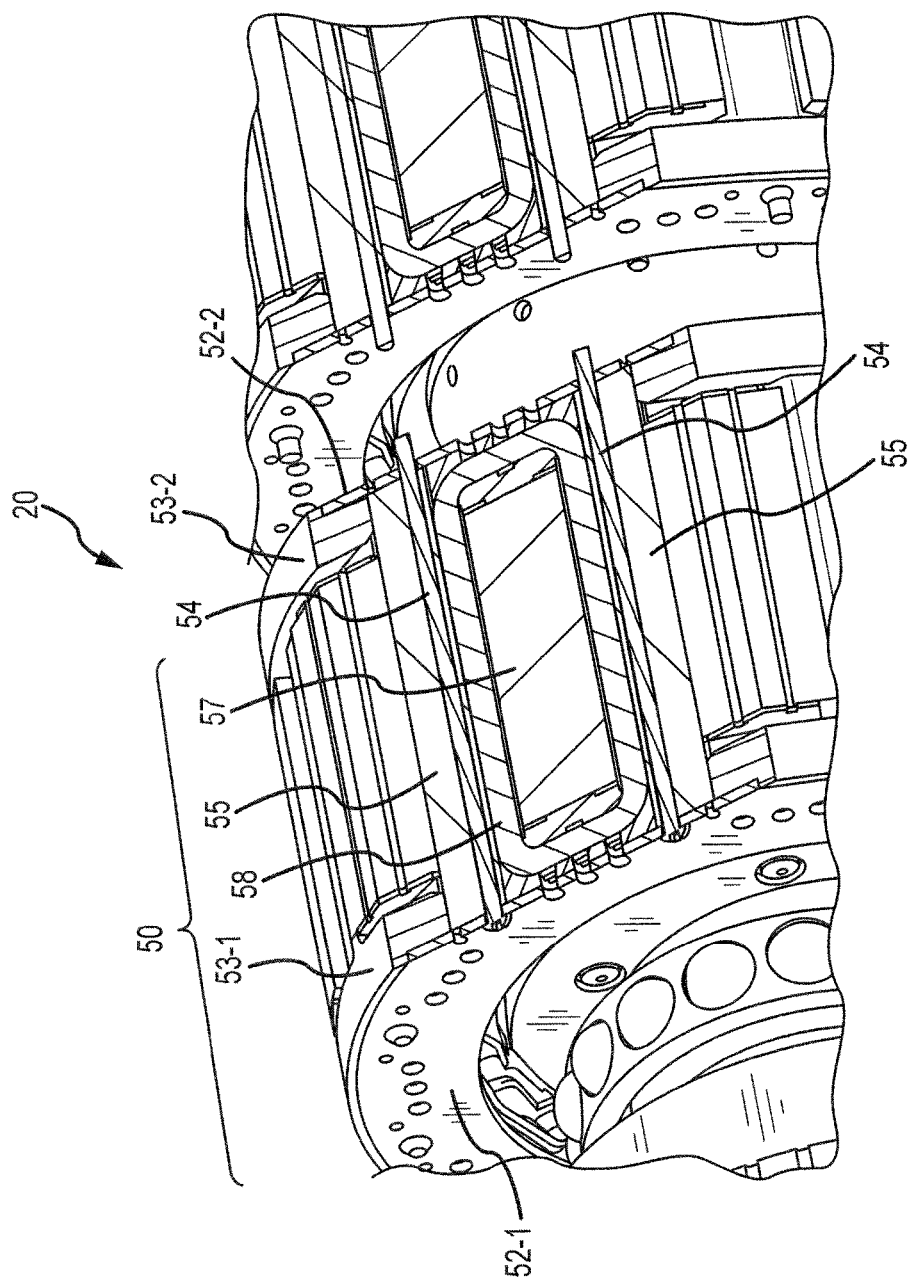
FIG. 4 illustrates a cut-away view of an example rotor system of a high speed electrical machine having a rotor lamination and clamping structure, in accordance with various embodiments.

With reference to FIGS. 2 and 4, each winding-pole set 40 may comprise a winding 58 and a pole 57. A pole 57 may comprise a ferromagnetic structure extending radially outward from the main stage generator rotor 20. The structure may be noncontiguous, for example, it may be made of planar layers called rotor laminations, which may be connected together by a binder, such as an epoxy. Thus, each pole 57 comprises a rotor lamination stack. For example, a rotor lamination stack may comprise a plurality of planar members that may be held together by epoxy, whereby a pole 57 is formed. Because the main stage generator rotor(s) 20 are mechanically rotated about the rotor axis, each pole 57 associated with the main stage generator rotor(s) 20 is subject to dislocation and distortion. For instance, the plurality of rotor laminations may dislocate or distort differently, or may experience different forces due to variations in the rotor laminations forming the poles 57.

Each winding-pole set 40 may also comprise a winding 58. A winding 58 may comprise a length of wire that is wrapped around the pole 57. In various embodiments, the wire is wrapped in a spiral, each turn lying in a plane substantially tangential to the rotational path of the pole 57 (e.g., about the rotational axis of the main stage generator rotor 20). The winding 58 may be wrapped so that consecutive turns of the spiral lie in planes progressively radially outward of one another.

Figure 3:
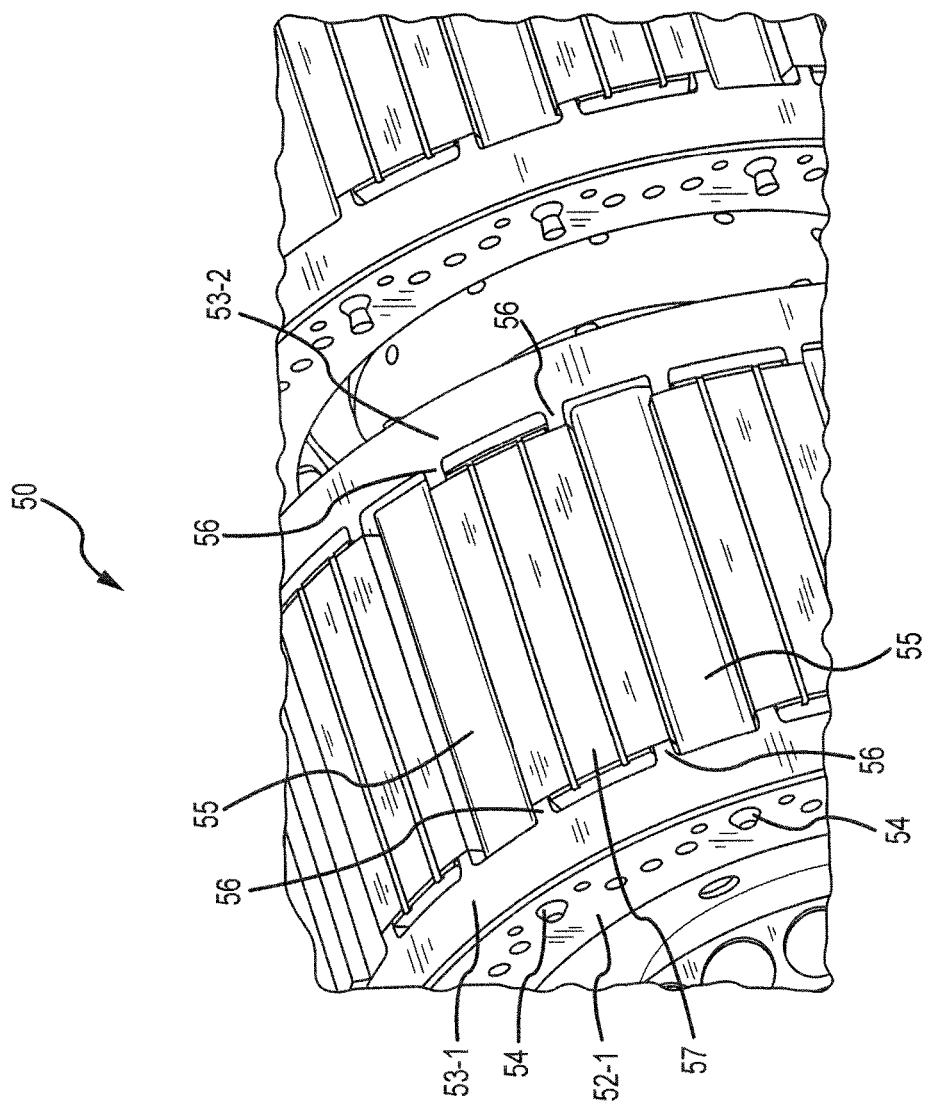
FIG. 3 illustrates an close-up view of an example rotor system of a high speed electrical machine having a rotor lamination and clamping structure, in accordance with various embodiments.

With particular reference to FIGS. 2-4, a main stage generator rotor 20 may comprise a plurality of winding-pole sets 40 and a lamination clamping structure 50. The lamination clamping structure 50 may at least partially enclose one or more winding-pole sets 40 and prevent dislocation of the poles 57 and/or windings 58. In various embodiments, a main stage generator rotor 20 may comprise twelve winding-pole sets 40 spaced annularly around the central axis of the main stage generator rotor 20. However, any number of winding-pole sets 40 configured to produce a desired current and voltage under desired operating conditions may be selected.

Figure 5:
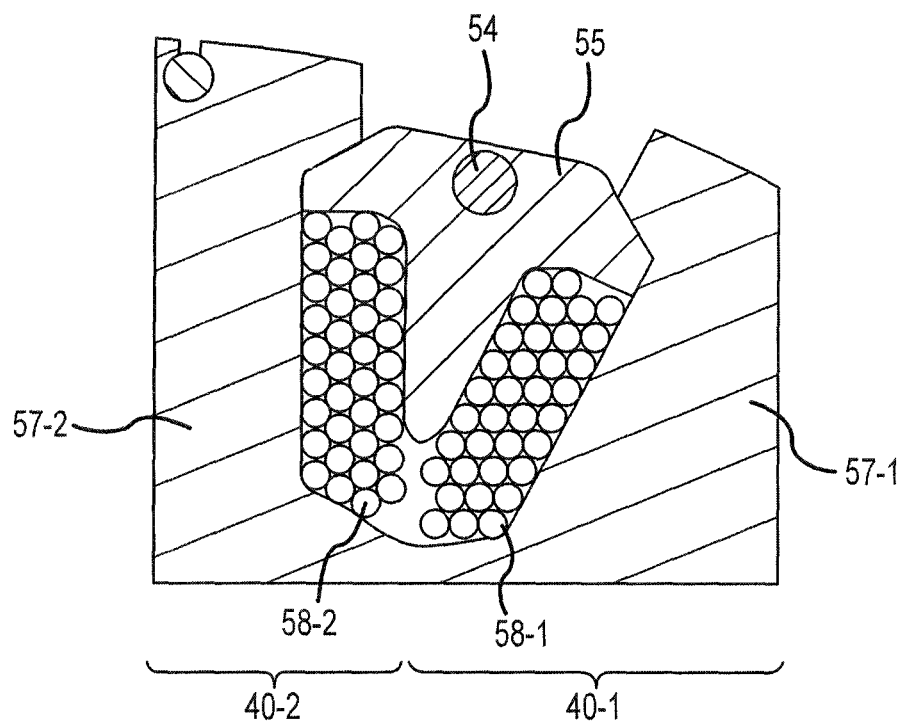
FIG. 5 illustrates a profile view of various aspects of a lamination clamping structure installed in an example rotor system of a high speed electrical machine.

With reference to FIGS. 2-4 and additional reference to FIG. 5, a lamination clamping structure 50 may comprise a first axial containment plate 52-1, a second axial containment plate 52-2, a first annular containment member 53-1, a second annular containment member 53-2, a tensioning apparatus 54, one or more winding support wedges 55, and one or more lamination clamps 56. The first axial containment plate 52-1 and the second axial containment plate 52-2 may each comprise an annular plate axially adjacent to axially opposite sides of the winding-pole set 40. The first annular containment member 53-1 and the second annular containment member 53-2 may both be positioned sufficiently close to the winding-pole set 40 so that the each axial containment plate 52-1 and 52-2 prevents windings 58 from axial movement sufficiently such that the turns of the spiral comprising the winding 58 cannot tumble radially outward over one another. For instance, if the turns of the winding 58 were permitted to move axially by at least the thickness of the wire comprising the winding 58 then the turns could tumble radially outward over one another and the winding 58 could dislocate. Thus, each axial containment plate 52-1 and 52-2 is positioned less than one diameter of the wire comprising the winding 58, away from the winding 58 (as measured along the axis of the main stage generator rotor 20). The first axial containment plate 52-1 and the second axial containment plate 52-2 may be each axially outboard of the windings 58 on opposite outboard sides, so that the windings 58 are axially inboard of the first axial containment plate 52-1 and axially inboard of the second axial containment plate 52-2.

Furthermore, each axial containment plate 52 may comprise an annular plane extending in a radial plane relative to the main stage generator rotor 20. The annular plane may be disposed axially outboard of the windings 58, trapping the windings 58 between the axial containment plate 52 and the pole 57. The axial containment plate 52 is oriented so that a normal axis of the axial containment plate 52 is parallel to the axis of the main stage generator rotor 20. Thus, one may say that the axial containment plate 52 "axially contains" an "end-turn" of the windings 58 (e.g., the axially outermost portion of the windings 58, and/or the portion of the windings 58 running perpendicular to the axis of the main stage generator rotor 20).

While the first axial containment plate 52-1 and second axial containment plate 52-2 are each illustrated as an annular plane herein, in further embodiments, the axial containment plate 52 may comprise any shape or configuration adapted to prevent the windings 58 from unwanted movement such as radial translation of the winding 58 that may occur if the winding 58 is not contained in an axial direction, and is thus permitted to tumble radially outward. In this manner, the first axial containment plate 52-1 and the second axial containment plate 52-2 may be said to "axially contain" the windings 58.

The lamination clamping structure 50 further comprises an annular containment member 53. The annular containment member 53 may comprise an annular cylinder section. For example, each annular containment member 53 may circumferentially encircle a portion of the main stage generator rotor 20, and may extend in an axial direction in order to form a cylindrical surface. The first annular containment member 53-1 may be mechanically connected to the first axial containment plate 52-1 at the radially outermost edge of the first axial containment plate 52-1. Similarly, the second annular containment member 53-2 may be mechanically connected to the second axial containment plate 52-2 at the radially outermost edge of the second axial containment plate 52-2. Each annular containment member 53 may extend inwardly from its respective axial containment plate 52 toward the winding-pole sets 40. Thus, the first annular containment member 53-1 may be said to be axially inboard the first axial containment plate 52-1, relative to the winding-pole sets 40, and the second annular containment member 53-2 may be said to be axially inboard the second axial containment plate 52-2, relative to the winding-pole sets 40.

The first annular containment member 53-1 and/or the second annular containment member 53-2 provides support to the lamination clamps 56, as discussed further herein. As also discussed further herein, the first annular containment member 53-1 and/or the second annular containment member 53-2 may also each be disposed radially outboard of the winding support wedges 55 and may each extend axially inward atop the winding support wedges 55, so as to prevent the winding support wedge 55 from traveling radially out of place, and/or shifting axially. However the first annular containment member 53-1 and the second annular containment member 53-2 may be positioned in any manner so as to retain the winding support wedges 55 within a first annular circumference about the main stage generator rotor 20 and further to provide support to the lamination clamps 56.

The lamination clamping structure 50 may further comprise one or more tensioning apparatuses 54. A tensioning apparatus 54 may comprise a shaft, extending through an aperture disposed in the axial containment plate 52 and into the main stage generator rotor 20. The tensioning apparatus 54 may comprise a threaded shaft, such as a bolt, or any other desired structure. In further embodiments, the tensioning apparatus 54 extends through an aperture disposed in the first axial containment plate 52-1, through various components, such as a winding support wedge 55, and through the second axial containment plate 52-2. For example, in various embodiments, the tensioning apparatus 54 comprises a shaft that extends through an aperture disposed in the first axial containment plate 52-1 and through an aperture disposed in a winding support wedge 55, terminating in a second axial containment plate 52-2 disposed at the axially opposite face of the main stage generator rotor 20. In various embodiments, a tensioning apparatus 54 extends through an aperture disposed in the axial containment plates 52 and that is located radially outward of each radially outermost side of each winding-pole set 40. Moreover, the tensioning apparatus 54 may extend through each axial containment plate 52 normal to the plane of the surface of that axial containment plate 52. Thus, it may be said that a tensioning apparatus 54 extends between each winding-pole set 40, and each into a corresponding winding support wedge 55, whereby the first axial containment plate 52-1 and the second axial containment plate 52-2 of the lamination clamping structure 50 is held in position relative to the windings 58, and the annular containment member 53 is held in position relative to the winding support wedges 55. One may further appreciate that because the lamination clamps 56 are supported by the annular containment members 53, the tensioning apparatus 54 further provides the force exerted by the lamination clamps 56 on the rotor lamination stack of the poles 57, as discussed further herein.

The lamination clamping structure 50 may further comprise one or more lamination clamps 56. The lamination clamps 56 may comprise any apparatus whereby axially compressive force may be applied along the axis of rotation (8; FIG. 2) to the rotor lamination stack of one or more pole 57. In this manner, radial forces experienced by one or more rotor lamination of the rotor lamination stack may be more effectively transmitted to adjacent rotor laminations of the rotor lamination stack. The lamination clamps 56 may comprise flanges extending axially inward from the first annular containment member 53-1 and the second annular containment member 53-2. In further embodiments, the lamination clamps 56 may comprise bosses extending both axially inward from an annular containment member 53 and radially inward or outward from an annular containment member 53. In still further embodiments, the lamination clamps 56 may comprise any structure whereby axially compressive force may be applied to the rotor lamination stack of one or more pole 57. In various embodiments, one or more tensioning apparatus 54 establishes an axially compressive force on the axial containment plate 52 of the lamination clamping structure 50. The axial containment plate 52 conveys this force to the annular containment member 53, whereby it is imparted to the lamination clamps 56. In this manner, the lamination clamps 56 may be said to "clamp" the rotor lamination stack comprising one or more pole 57.

In various embodiments, two lamination clamps 56 are provided on the first annular containment member 53-1 for each winding-pole set 40, and two lamination clamps 56 are provided on the second annular containment member 53-2 for each winding-pole set 40. For instance, a lamination clamp 56 may be disposed at each circumferentially outboard edge of each pole 57 of each winding-pole set 40. However, further embodiments may comprise one continuous lamination clamp 56 extending around the entire circumference of the main stage generator rotor 20, or may comprise one lamination clamp 56 for each winding-pole set 40, or may comprise three lamination clamps 56 for each winding-pole set 40, or may comprise any desired number of lamination clamps 56. In various embodiments comprising twelve winding-pole sets 40, there are twenty-four lamination clamps 56.

Finally, and with particular reference to FIG. 5, the lamination clamping structure 50 may comprise at least one winding support wedge 55. The winding support wedge 55 may comprise a wedge member whereby the windings 58 of one or more winding-pole set 40 are held in place. In various embodiments, the winding support wedge 55 is T-shaped. The winding support wedge 55 may hold the co-axial portion of the windings 58 in place, thus cooperating with the axial containment plates 52-1 and 52-2, which each hold opposite end-turn portions of the windings 58 in place. The winding support wedge 55 provides enhanced support to the windings 58. For instance, the winding support wedge 55 may comprise a T-shaped member extending co-axially relative to the main stage generator rotor 20. The T-shaped member may have a radially extending portion that extends into a space between winding-pole sets 40. The T-shaped member may have a circumferentially extending portion that extends to occupy the area between winding-pole sets 40. Thus, the winding support wedge 55 may be inserted between winding-pole sets 40, and may retain the windings 58 of each winding-pole set 40 in proper position.

Moreover, the winding support wedge 55 may comprise a longitudinal aperture through which a tensioning apparatus 54 may extend. In this manner, the radial force exerted on the poles 57 by the winding support wedge 55 when under the influence of centrifugal force, may be at least partially transferred to the tensioning apparatus 54, ameliorating the load on the rotor laminations comprising the poles 57. Furthermore, the radial force exerted on the poles 57 by the windings 58 when under the influence of centrifugal force, may be at least partially transferred to the tensioning apparatus 54, also ameliorating the load on the rotor laminations comprising the poles 57. In this manner, the winding support wedge 55 may both retain the windings 58 of each winding-pole set 40 in proper position, and diminish the centrifugal load placed on the rotor laminations comprising the poles 57. The winding support wedge confines the lamination stack comprising stack of separate planar members, carrying various centrifugal loads placed on the various rotor laminations comprising the poles 57. Because this load is not evenly shared among the other rotor laminations, each lamination may carry a different load. By transferring at least a portion of the loads to the winding support wedge, the tendency of one or more rotor laminations to fracture and/or crack under centrifugal force is ameliorated. As such, one may appreciate that both the winding support wedge 55 and the lamination clamps 56 operate to ameliorate the tendency of one or more rotor laminations to fracture and/or crack under centrifugal force, in addition to the winding support wedge retaining the windings 58 of each winding-pole set 40 in proper position.

For instance, with reference to FIG. 5, a first winding-pole set 40-1 may comprise a pole 57-1 and a first winding 58-1 and a second winding-pole set 40-2 may comprise a second pole 57-2 and a second winding 58-2. A winding support wedge 55 may be disposed between the first winding 58-1 and the second winding 58-2, thereby ameliorating the centrifugal loading on both the first pole 57-1 and the second pole 57-2.

As such, in various embodiments, a winding support wedge 55 is disposed between each winding-pole set 40. Thus, in various embodiments wherein the main stage generator rotor 20 comprises twelve winding-pole sets 40, the lamination clamping structure 50 may comprise a corresponding twelve winding support wedges 55.

Having discussed various aspects of a generator rotor system 2 and lamination clamping structure 50, a generator rotor system 2 and lamination clamping structure 50 may be made of many different materials or combinations of materials. For example, various components of the system may be made from metal. For example, various aspects of an generator rotor system 2 and lamination clamping structure 50 may comprise metal, such as titanium, aluminum, steel, or stainless steel, though it may also comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of a generator rotor system 2 and lamination clamping structure 50 as disclosed herein are made of different materials or combinations of materials, and/or may comprise coatings.

In various embodiments, a generator rotor system 2 and lamination clamping structure 50 may comprise multiple materials, or any material configuration suitable to enhance or reinforce the resiliency and/or support of the system when subjected to wear in an aircraft operating environment or to satisfy other desired electromagnetic, chemical, physical, or material properties, for example radar signature, heat generation, efficiency, electrical output, strength, or heat tolerance.

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or industrial generators, or power plant generator systems, or portable generators, or propulsion systems, or any other system or process having need for electric machines.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A main stage generator rotor comprising:
a first winding-pole set comprising a winding and a pole comprising rotor laminations; and
a lamination clamping structure,
wherein the main stage generator rotor has an axis of rotation;
wherein the lamination clamping structure is disposed proximate to the pole of the first winding-pole set and exerts a compressive force on the rotor laminations along the axis of rotation;
a second winding-pole set;
wherein the lamination clamping structure comprises a winding support wedge disposed between the first winding-pole set and the second winding-pole set;
whereby a co-axial portion of the windings of the first winding-pole set is held in position by the winding support wedge, and whereby a co-axial portion of the windings of the second winding-pole set is held in position by the winding support wedge;
wherein the winding support wedge comprises:
a longitudinal aperture through which a tensioning apparatus extends, wherein a radially innermost point of the longitudinal aperture is at a greater distance from a radial center of the rotor than a radially outermost point of the windings of the first winding-pole set and the second winding-pole set; and
wherein the lamination clamping structure further comprises:
a lamination clamp comprising a flange extending axially inward from a first annular containment member and axially inward from a second annular containment member,
wherein the first annular containment member and the second annular containment member are disposed axially outboard of the first winding-pole set, whereby the lamination clamp is held in mechanical communication with the rotor laminations of the pole of the first winding-pole set;

a first axial containment plate comprising an annular plate axially outboard the first annular containment member, relative to the first winding-pole set, and supporting the first annular containment member;
a second axial containment plate supporting the second annular containment member and comprising an annular plate axially outboard the second annular containment member, relative to the first winding-pole set, and disposed at the axially opposing side of the first winding-pole set relative to the first axial containment plate; and
the tensioning apparatus comprising a shaft extending through an aperture disposed in the first axial containment plate and terminating in the second axial containment plate whereby the compressive force is exerted on the first axial containment plate and the second axial containment plate.

2. The main stage generator rotor according to claim 1, wherein the main stage generator rotor comprises twelve winding-pole sets.

3. The main stage generator rotor according to claim 1, wherein the winding support wedge further comprises a circumferentially extending portion that extends to occupy an area between the first winding-pole set and the second winding-pole set.

4. The main stage generator rotor according to claim 3, wherein the winding support wedge further comprises a radially extending portion extending between the first winding-pole set and the second winding-pole set.

5. The main stage generator rotor according to claim 4, wherein the winding support wedge is T-shaped.

6. The main stage generator rotor according to claim 4, wherein the longitudinal aperture through which the tensioning apparatus extends is disposed in the circumferentially extending portion.

7. The main stage generator rotor according to claim 4, wherein the circumferentially extending portion and the radially extending portion are formed from a single piece.

8. The main stage generator rotor of claim 1, wherein the longitudinal aperture and the windings of the first winding-pole set and the second winding-pole set are circumferentially independent.

9. A generator rotor system comprising:
a first exciter rotor;
a second exciter rotor;
a permanent magnet rotor;
a first main stage generator rotor;
a second main stage generator rotor,
wherein each of the first main stage generator rotor and the second main stage generator rotor share an axis of rotation,
wherein the first exciter rotor is disposed at an axial outboard end of the generator rotor system,
wherein the permanent magnet rotor is disposed at a second axial outboard end of the generator rotor system,
wherein the second exciter rotor is disposed adjacent to and axially inboard of the permanent magnet rotor,
wherein the first main stage generator rotor and the second main stage generator rotor are both disposed axially inboard of the first exciter rotor and the second exciter rotor, and
wherein each of the first main stage generator rotor and the second main stage generator rotor comprise:
a first winding-pole set comprising a winding and a pole comprising rotor laminations; and
a lamination clamping structure, wherein the lamination clamping structure is disposed proximate to the pole of the first winding-pole set and exerts a compressive force on the rotor laminations along the axis of rotation, wherein each of the first main stage generator rotor and the second main stage generator rotor comprise a second winding-pole set, wherein the lamination clamping structure comprises a winding support wedge disposed between the first winding-pole set and the second winding-pole set, wherein the winding support wedge comprises a longitudinal aperture through which a tensioning apparatus extends, wherein a radially innermost point of the longitudinal aperture is at a greater distance from a radial center of the rotor than a radially outermost point of the windings of the first winding-pole set and the second winding-pole set; and wherein the lamination clamping structure further comprises:

a lamination clamp comprising a flange extending axially inward from a first annular containment member and axially inward from a second annular containment member, wherein the first annular containment member and the second annular containment member are disposed axially outboard of the first winding-pole set, whereby the lamination clamp is held in mechanical communication with the rotor laminations of the pole of the first winding-pole set;

a first axial containment plate comprising an annular plate axially outboard the first annular containment member, relative to the first winding-pole set, and supporting the first annular containment member;

a second axial containment plate supporting the second annular containment member and comprising an annular plate axially outboard the second annular containment member, relative to the first winding-pole set, and disposed at the axially opposing side of the first winding-pole set relative to the first axial containment plate; and a tensioning apparatus comprising a shaft extending through an aperture disposed in the first axial containment plate and terminating in the second axial containment plate whereby the compressive force is exerted on the first axial containment plate and the second axial containment plate.

10. The generator rotor system according to claim 9, wherein the first main stage generator rotor and the second main stage generator rotor each comprise twelve winding-pole sets.

11. The generator rotor system according to claim 9, wherein the winding support wedge comprises a wedge whereby a co-axial portion of the windings of the first winding-pole set is held in position and whereby a co-axial portion of the windings of the second winding-pole set is held in position.

12. The generator rotor system according to claim 11, wherein the winding support wedge further comprises a circumferentially extending portion that extends to occupy an area between the first winding-pole set and the second winding-pole set.

* * * * *